May 16, 1939. T. L. SHEPHERD Re. 21,090
RUBBER PROCESS
Original Filed May 13, 1935
Fig. 1.
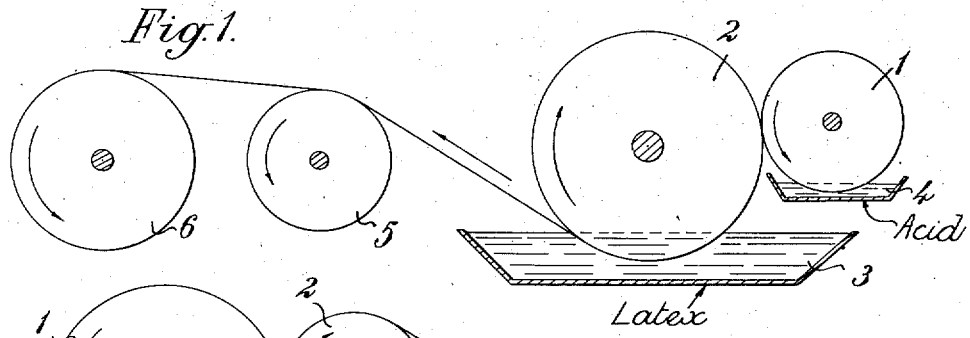
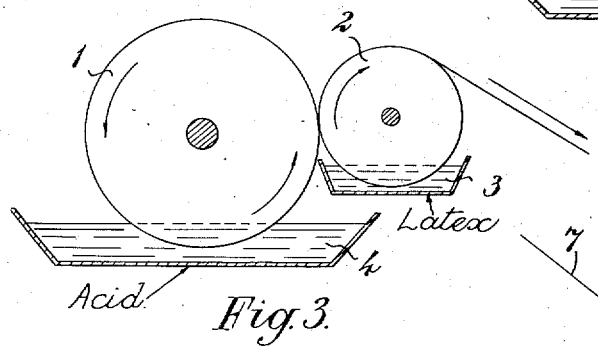
Fig. 3.
Fig. 2.
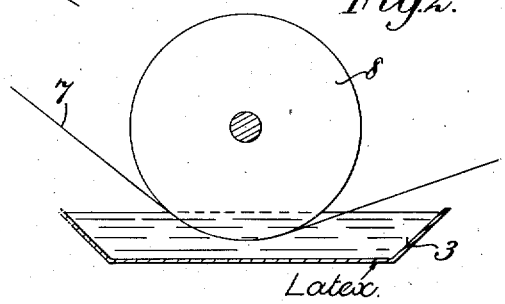
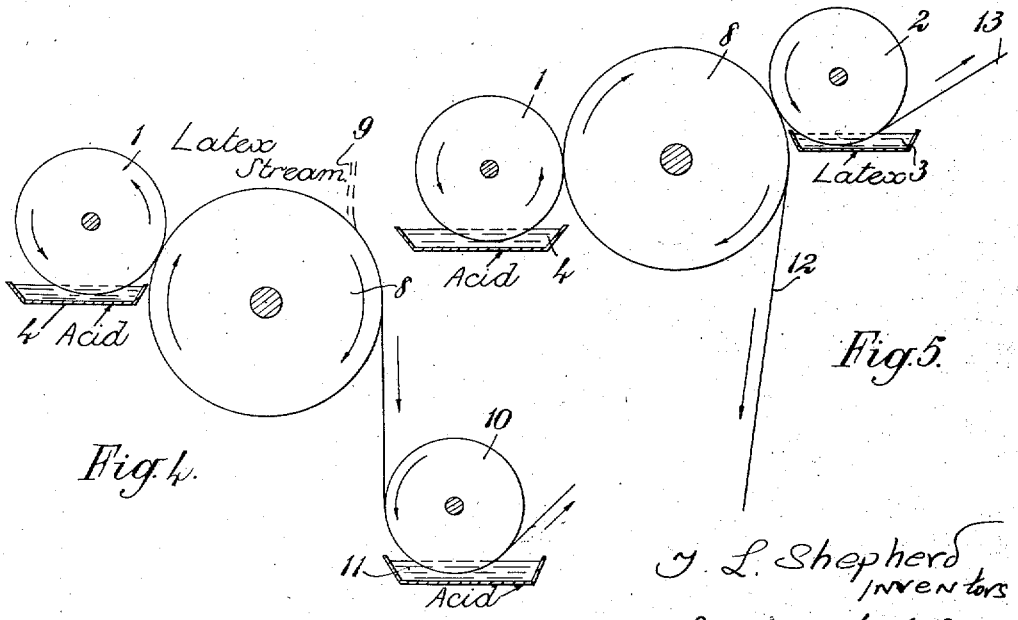
Fig. 4.
Fig. 5.
T. L. Shepherd
INVENTOR
By: Glascock Downing & Seebold
Attys.

Reissued May 16, 1939

Re. 21,090

UNITED STATES PATENT OFFICE 21,090

RUBBER PROCESS

Thomas Lewis Shepherd, London, England

Original No. 2,131,982, dated October 4, 1938, Serial No. 21,265, May 13, 1935. Application for reissue January 23, 1939, Serial No. 252,512. In Great Britain May 12, 1934

10 Claims. (Cl. 18—54)

(Granted under the provisions of sec. 14, act of March 2, 1927; 357 O. G. 5)

This invention relates to a method of and apparatus for making threads, filaments or bands from rubber or latex hereinafter generically termed thread from coagulable dispersions of elastic materials such as rubber latex.

By means of known existing methods a stream of aqueous dispersion of rubber commonly termed latex is extruded from a nozzle into a coagulant, and the coagulated stream is then led away from the coagulating bath to be further treated.

The reverse process has also been suggested, namely the extrusion through a nozzle or orifice of suitable coagulant such as acetic acid, alcohol and the like into a bath containing latex, the rubber coagulating around the stream of acid and forming a rubber thread which is then led out of the latex for further treatment.

This method has the disadvantage of being entirely dependent upon the uninterrupted stream (and a very fine one at that) of acid flowing through a very fine nozzle into the latex, causing the extruding nozzle to become clogged very easily, thereby causing breakages of the thread already formed and not yet led out of the coagulation bath whilst in addition some of the coagulant when led into the bath will not follow the stream but will disperse in the latex, consequently causing loose aggregations of latex in a coagulated or partly coagulated state to become suspended in the bath.

This drawback is aggravated by the fact that these lumps or aggregations cannot be very easily located as they are exactly of the same colour as non-coagulated fluid, and these lumps will eventually interfere with the thread whilst it is being coagulated and whilst it is still in a delicate and weak state.

The object of the invention to be hereinafter described is an improved process for the manufacture of such threads or filaments, in which the above drawbacks are overcome. Another object of the invention is to obtain a device by which the method hereinafter described may be carried into effect.

Experiments and research have shown that the principle of making a filament by applying the appropriate solution to the thin edge of a disc wheel and then immersing such edge in a coagulating bath may be developed in various ways, and these variants of such a principle form another object of the invention hereinafter described.

According to the present invention the method consists in bringing a suitable coagulant, for example acetic acid of suitable strength or concentration, or alcohol or any other suitable coagulant into contact with an aqueous dispersion of rubber either latex or natural or artificial rubber by first giving the coagulant a predetermined shape, utilizing for this purpose a base or support, then leading the coagulant thus shaped as well as the base or support into a bath of latex, for example, where the latex will coagulate around the coagulant and its base or support, in this way forming a thread or ribbon and then withdrawing from the latex bath the so formed thread or ribbon, by separating it from its base and leading the new thread away for further treatment, allowing the base or support to continue its travel, in order that a continuous manufacture may be maintained.

In order to give the coagulant a predetermined shape which requires to be retained through the coagulating process, it is impossible to use extrusion methods. It is therefore necessary to introduce in the process a substance or substances forming a temporary base, to hold the coagulant in shape before and during the process of coagulation, removing the coagulated thread, ribbon or filament from the shape, as soon as it has attained sufficient strength.

A further object of this base or support which holds the coagulant is to prevent even the smallest quantity of liquid coagulant to be detached separately, mixing independently in the latex bath and coagulating there and thereby causing loose lumps aforesaid.

The invention consists in process for producing rubber thread which consists in applying coagulant to a supporting member, placing it in contact with latex, and withdrawing the coagulum from said supporting member.

The invention also consists in process for producing rubber thread which consists in applying coagulant to a rotating member, placing the coagulant in contact with latex, transferring the coagulum to a second rotating member, and withdrawing the coagulum from said second supporting member.

The invention also consists in process for producing rubber thread which consists in applying coagulant to a yarn or wire, placing in contact with latex, splitting the coagulum, and withdrawing it from the yarn or wire.

The invention also consists in process for producing rubber thread, which consists in coating a surface with coagulant, printing thereupon with latex by means of a roller or nozzles, and removing the coagulum.

The invention also consists in rubber thread when produced according to any of the methods hereinafter described.

The invention will be described by way of example with reference to the accompanying diagrammatic drawing Figures 1 to 5.

In Figure 1 there is employed a very thin rotating disc or wheel 2 or when placed on a common spindle a series of discs or wheels, which all have their lower edges submerged to a suitable degree in the bath 3 of latex. By suitable and known means, preferably by what is commonly known as a providing or doctor roller 1, the fine edges of the discs are covered with a suitable coagulant such as acetic acid of any required strength or an alcohol or any other suitable and known coagulant, and to hold this coagulant firmly in place it is advisable (although not absolutely necessary) to form it into a viscous condition suitable for the purpose, and non-injurious to the finished product. For this purpose any suitable substances may be used such as cellulose, acetate, glucose, natural or synthetic resins and the like or any other suitable viscous substance.

The disc 2 with the coagulated coated edge is then rotated into the latex in the bath 3 and the latex will immediately coagulate round the shaped coagulant on the disc at the edge, and will soon be sufficiently strong to be pulled off therefrom, either just before it emerges from the surface of the bath or immediately after, or at any point before it again comes round to the roller which supplies the new quantity of coagulant. The thread so formed is still tacky and soft, but the pull required to separate it from the edge of the disc would cause the newly formed thread to assume a round in cross section and thus obliterates any mark which might be caused on the thread by the imprint of the disc edge. The clean edge of the disc is then rotated onwards towards the roller which supplies the coagulant, and it again gives or eventually gives a newly shaped supply of coagulant, thus forming a continuous thread producing process. In case of necessity the bare or clean part of the disc edge may be cleansed by any suitable method from any particles still adhering to it before it again reaches the coagulant supplying roller.

The thread so formed may be run through a spray of coagulant or over a roller 5 running in and consequently covered with coagulant or it may be run through a coagulating bath to eliminate tackiness and ensure thorough coagulation.

It may after leaving the disc edge be stretched to any required fineness, by the roller 5 or other means, for instance by the roller 6 which rotates quicker or is of larger diameter, powdered in any suitable and known way, and if required is subsequently vulcanized.

The edge of the disc may be of any shape or section and form as may be required, or it may be grooved. The thread when leaving the edge may also be led away with or without tension either by a pulling drum or by a travelling blanket or band, suitably powdered or provided with a coagulant to prevent sticking. Each disc will consequently produce a continuous thread and a series of such discs may be used to produce simultaneously a number of such continuous threads. The diameter of the disc or discs may be small or large, bearing in mind that the fineness of the ultimate elastic thread produced is governed by the following main factors:

1. The strength of the coagulant.
2. The predetermined shape of the coagulant.
3. The time of immersion in the latex bath of the shaped coagulant.
4. The pull used to separate the thread from the edge of the disc.
5. The possible subsequent further stretching.
6. The strength of the latex.

Instead of a disc edge any other suitable type of support may be used, for instance the edge of a continuous ribbon, but the actual procedure of fixing the coagulant on to the edge, then running it through the coagulum, then taking the so formed thread off the ribbon with or without a pull and (after possible cleaning) applying the coagulant again to the edge, remains in principle the same. In a modification another method may consist, Figure 2, in coating a continuous or discontinuous yarn or wire 7 by suitable means or impregnating it with a suitable coagulant as above mentioned, and this thread, yarn or wire is led into a latex bath 3, where the rubber immediately coagulates round it.

This rubber coating is, when the process commences, taken off the yarn or wire, whilst still in the latex or immediately after the pulling-off action, causing the fine rubber tube to tear lengthwise allowing the yarn or wire of predetermined shape to continue its travel towards obtaining a further supply of coagulant. The divided miniature rubber tube now in effect a rolled narrow strip of continuous sheet, still tacky and soft, is led to a roller or drum which pulls it and as a result thereof the divided tube becomes elongated and thinner in cross section, and on reaching the pulling roller or even before it so reaches the roller, has acquired more or less a round cross sectional shape and is sufficiently firm. From this roller the thread so formed is led away to receive further treatments as specified above and during the travel from the yarn or wire to the pulling roller the new rubber thread may be sprayed with coagulant to prevent tackiness, and to ensure perfect and complete coagulation and where desired it may also be powdered.

The coagulants used in the above mentioned process may have dyestuffs mixed therewith, which when penetrating the coagulating thread will impart the colour to the rubber thread being formed. The latex in the bath may also be dyed and subsequent powdering may also be effected by means of dyed lakes or by any other suitable method.

The latex bath used in the above mentioned process may contain finely comminuted fibres, for example, cotton, silk, viscose, wool or the like, either dyed or undyed, thereby giving the thread formed therefrom the appearance of cotton, silk and the like and will impart to it or them some of the properties of these substances such as a dye absorbing capacity.

With regard to the apparatus used for carrying the method into effect, instead of running the disc edge as mentioned and provided with the shaped coagulant through a bath of latex, this bath may be replaced by a roller, either plain or grooved, the grooves being arranged to run parallel with the edge of the roller. Such roller carries on the plain surface or in the grooves a sufficient supply of latex and the contact of the coagulant covered edge will cause this edge to take off a sufficient supply of rubber or latex from the roller surface or from the grooves to form a thread. In a further modification there may be applied to a smooth moving surface, for instance a bowl or banket, a very thin coating of coagulant and then to print on top of this coagulant a fine line or series of fine lines running parallel with the edge of the bowl or blanket, these fine lines to be applied by means of an intaglio or surface engraved roller or by means of fine nozzles.

On contact with the coagulant covered surface the fine lines of aqueous rubber coagulate immediately into fine thread, which can then be taken off for subsequent treatment as described above.

When and if desired any of the foregoing solutions or mixtures which form the coagulant may be compounded with suitable additions for the purpose of improving the final product, for example in the case of rubber dispersions or solutions, accelerators, fillers, antioxidants, colouring matters, preservatives, vulcanizing agents or softeners may or may not be included.

According to Figure 3 the the disc 1 is adapted to rotate with its lower edge in contact wlth acid or other coagulant 4, whilst the solution is supplied on a contact roller or disc 2 as before described, the solution meeting the coagulant as it rises out of the bath.

In a further modification, Figure 4, the carrying disc 8 may pick up a thread of acid as before described and in the course of its further rotation, a charge of latex 9 may be streamed upon the carrying disc edge with the thread thereon, whereby coagulation is at once commenced and after continuing to pass round the carrying disc for a short distance, the completed thread may then be drawn off and pass to another disc or roller 10 which runs in an acid bath 11 to complete if necessary the process of coagulation.

According to the next embodiment, Figure 5, there are provided a solution supply roller or disc 2 and an acid or coagulant supply roller or disc 1 and these are both separate and rotate with their lower edges in contact with the corresponding liquid in their respective baths 3 and 4.

Between these two discs there is arranged a carrying disc 8 and this disc or roller has its diametrically opposite edges in contact with the solution and acid discs or rollers respectively. Preferably the arrangement is such that with the carrying disc rotating clockwise, it will receive from the solution disc a thread which will then be carried round and brought into contact with a similar thread on the acid supply disc. The thread which is then immediately coagulated may be either led direct away from the carrying disc as at 12 or the coagulating thread may be led round by the acid disc down into the coagulating bath for completing the process of coagulation as at 13. The thread may then be drawn out of the bath in the ordinary way and led away for the appropriate finishing treatment.

Such an arrangement as that before described may be reversed, that is to say, the carrying disc may first pick up a thread of latex and then lead it into contact with a thread of acid.

It is to be understood that a number of discs may be arranged to all simultaneously receive a charge of solution or coagulant as the case may be and where they are immersed in a bath, the degree of immersion will be relatively very slight but the immersion may be increased depending upon the size of thread being formed. Further, the edge of the disc in any one case may be made with a finely cut groove to assist in the formation of the desired thread. Further, instead of the usual mixtures of liquid rubber, aqueous dispersion of latex or the like, any of the solutions which are employed in the artificial silk industry may be utilized, whereby threads or filaments of so-called artificial silk will be produced by coagulation from the discs arranged in the manner described.

Any of the arrangements described above may be fitted with the usual details such as heating devices for assisting the driving off of the thread or the partially completed threads may be passed through a heated chalk or other bath and again any suitable means may be employed to assist in the vulcanization of the threads thus produced, where rubber is concerned.

It will be found that the process is a continuous one and that the speed of rotation of the discs may be relatively high and that, depending upon the viscosity of the solutions which are used, so the size of the thread may be varied.

Where and if necessary the rollers or other devices such as blankets, which receive the completed thread, may travel at a faster speed than that at which the thread is delivered, so that a slight stretching effect may be imparted to the threads.

Where or if necessary a dye or dyes may be incorporated in the bath containing the solution or that containing the coagulant, so that the resulting threads will be already dyed.

It may also be noted that when the coagulated thread has to be taken away for further treatment, it is necessary to exert a certain pull to separate it from the disc. This has the result of somewhat stretching the thread, so that it receives a very smooth and non-frictional skin which facilitates the subsequent weaving or knitting of the thread in a bare or uncovered condition.

I claim:

1. In a process for producing rubber thread, wherein latex is coagulated by a coagulant, the steps of applying one of said substances to a support, applying the other of said substances to the first of said substances to partially coagulate the latex, withdrawing the partially coagulated latex from the support and permanently reducing the cross section of the coagulum by stretching it before the coagulation process is sufficiently advanced to set up stresses by the stretching operation which tend to retract the thread.

2. In a process for producing rubber thread, wherein latex is coagulated by a coagulant, the steps of applying one of said substances to a rotating member, applying the other of said substances to the first of said substances, withdrawing the coagulum from the rotating member, and stretching it before the coagulation process is so advanced that stresses are set up by the stretching which tend to retract the thread thereby obtaining a thread of permanently smaller cross section.

3. A process of producing rubber thread which consists in adding a viscous material to a coagulant, applying the coagulant to a rotating member applying latex to the coagulant, withdrawing the coagulum from the rotating member, and stretching it before the coagulation process is so advanced that stresses are set up by the stretching which tend to retract the thread thereby obtaining a thread of permanently smaller cross section.

4. A process as claimed in claim 2 in which further coagulant is supplied to the coagulum after stretching.

5. In a process of producing rubber thread wherein latex is coagulated by a coagulant, the steps of applying one of said substances to a filament, applying the other of said substances to the first of said substances, withdrawing the coagulum from the filament, and stretching it before the coagulation process is so advanced that stresses are set up by the stretching which tend to retract the thread thereby obtaining a thread of permanently smaller cross section.

6. A process as claimed in claim 5 in which a viscous material is added to the coagulant.

7. A process as claimed in claim 5 in which a viscous material is added to the coagulant and in which further coagulant is supplied to the coagulum after stretching.

8. A process of producing rubber thread which consists in applying a coagulant as a thin sheet to a moving surface, applying latex as a thread by impressing the same onto the sheet of coagulant, withdrawing the coagulum, and stretching it before the coagulation process is so advanced that stresses are set up by the stretching which tend to retract the thread thereby obtaining a thread of permanently smaller cross section.

9. A process as claimed in claim 8 in which a viscous material is added to the coagulant.

10. A process as claimed in claim 8 in which further coagulant is supplied to the coagulum after stretching.

THOMAS LEWIS SHEPHERD.